United States Patent [19]

Kreitzer

[11] Patent Number: 4,818,082

[45] Date of Patent: Apr. 4, 1989

[54] COMPACT WIDE-ANGLE CLOSE-FOCUS SLR ZOOM LENS

[75] Inventor: Melvyn H. Kreitzer, Cincinnati, Ohio

[73] Assignee: Eastman Kodak Company, Rochester, N.Y.

[21] Appl. No.: 199,509

[22] Filed: May 27, 1988

[51] Int. Cl.⁴ .................. G02B 15/14; G02B 27/00; G02B 9/62

[52] U.S. Cl. .................. 350/427; 350/426; 354/201

[58] Field of Search .......... 350/427, 423, 426; 354/155, 201

[56] References Cited

U.S. PATENT DOCUMENTS

| | | |
|---|---|---|
| 4,304,466 | 12/1981 | Betensky ................ 350/426 |
| 4,586,793 | 5/1986 | Tanaka et al. ............ 350/426 |
| 4,607,918 | 8/1986 | Ogata ................... 350/426 |
| 4,756,609 | 7/1988 | Estelle ................. 350/427 |
| 4,757,372 | 7/1988 | Betensky et al. ......... 354/201 |

FOREIGN PATENT DOCUMENTS 0222806 12/1984 Japan .
0068311 4/1985 Japan .

Primary Examiner—John K. Corbin
Assistant Examiner—Rebecca D. Gass
Attorney, Agent, or Firm—Armin B. Pagel

[57] ABSTRACT

A wide-angle close-focus zoom lens for a single lens reflex camera, said lens having no more than a total of three independent movable lens element units or subunits. The lens can have as few as eight lens elements without requiring any aspheric lens element surfaces.

4 Claims, 1 Drawing Sheet

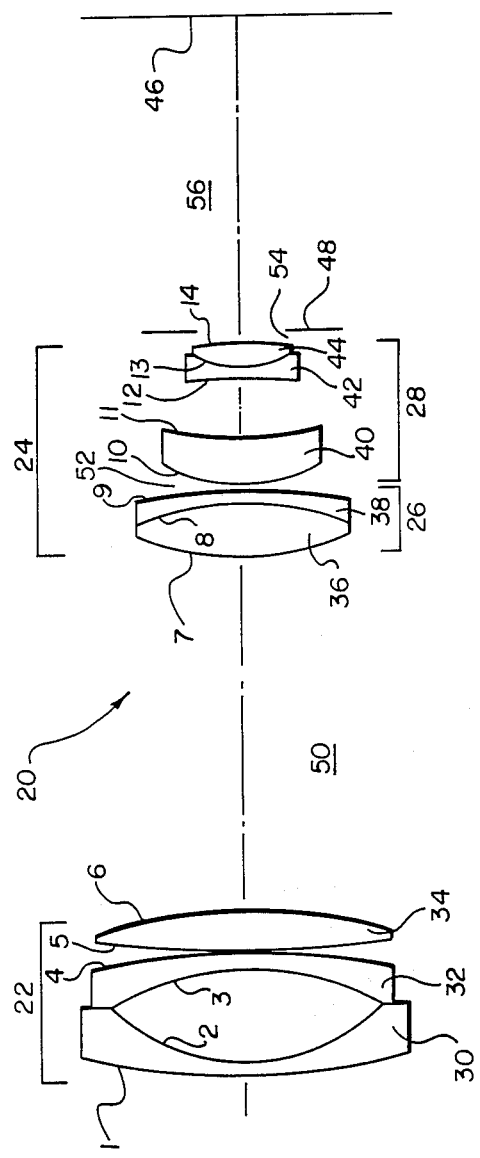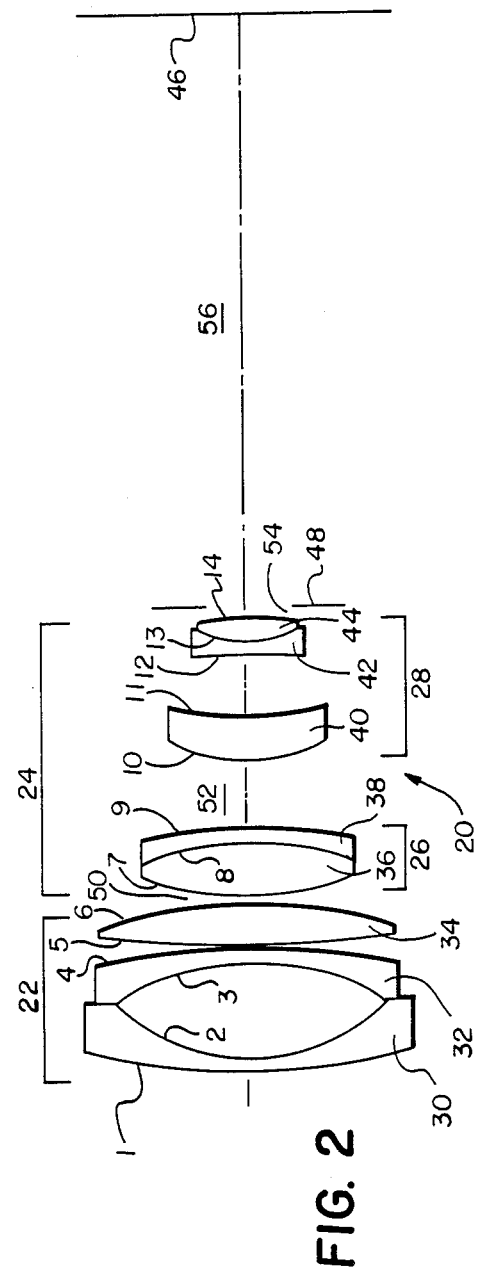
FIG. 1
FIG. 2

COMPACT WIDE-ANGLE CLOSE-FOCUS SLR ZOOM LENS

CROSS REFERENCE TO RELATED APPLICATIONS

Reference is made to commonly assigned copending U.S. patent application Ser. No. 161,070, entitled WIDE-ANGLE ZOOM LENS, filed Feb. 26, 1988.

BACKGROUND OF THE INVENTION

1. Field Of The Invention

The present invention relates to a compact wide-angle close-focus zoom lens suitable for a single lens reflex camera and more particularly to such a lens having no more than a total of three movable lens element units or sub-units. 2. Brief Description Of The Prior Art Commonly assigned co-pending U.S. patent application Ser. No. 161,070 entitled WIDE-ANGLE ZOOM LENS, filed on Feb. 26, 1988 is directed to compact wide-angle macro-focus zoom lenses which comprise a forward movable negative power focusing and compensating lens element unit followed by a movable positive power variator lens element unit comprising a forward positive power sub-unit and a rearward negative power sub-unit. The illustrative embodiments disclosed in this prior application are directed to relatively short back focus lenses, i.e. to lenses in which the back focus is inadequate to accommodate the viewfinder mirror of a conventional type of single lens reflex camera.

SUMMARY OF THE INVENTION

The present invention relates to lenses of the general type to which the foregoing U.S. patent application is directed, but which are characterized as close-focus rather than macro-focus and which have sufficient back focus to accommodate a viewfinder mirror in a single lens reflex camera. More particularly, the invention provides a wide-angle close-focus zoom lens of this type which is compact and of unusually simple and economical configuration, while having the capability of a substantial zoom range, e.g. 36–101. Briefly, this is accomplished by providing a negative forward focusing and compensating lens element unit comprising as few as three lens elements and a variator lens element unit comprising a movable forward positive power lens element sub-unit with as few as two lens elements and a movable rearward negative power lens element sub-unit with as few as three lens elements; whereby the entire lens requires no more than a total of three independently movable lens element units or sub-units and can have as few as a total of eight lens elements, without requiring any aspheric lens element surfaces.

BRIEF DESCRIPTION OF THE DRAWINGS

An illustrative preferred embodiment of the invention will now be described, by way of example, with reference to the accompanying drawings in which:

FIG. 1 is a diagram of the illustrative preferred embodiment of a wide-angle close-focus zoom lens in accordance with the present invention, in a short focal length condition;

FIG. 2 is a diagram corresponding to Figs. 1 and 2 but showing the illustrative lens in a long focal length condition.

DETAILED DESCRIPTION OF THE ILLUSTRATIVE PREFERRED EMBODIMENT

The illustrative lens 20 shown in FIGS. 1 and 2 is a wide-angle close-focus zoom lens with a zoom range of approximately 36.2 to 101, intended for use in a 35 mm single lens reflex camera having a movable mirror between the rearwardmost lens element and the camera's film plane. The term "wide-angle" means that the lens is capable of a minimum focal length shorter than the image diagonal, which for conventional 35 mm image format is 43.26 mm. As used herein, the term "close-focus" means that the lens can have an object to image size ratio of less than 5:1 at the long focal length condition. In all illustrating and the descriptions thereof, throughout the specification, the lens is understood to be focused at infinity. Additionally, it should be understood that the illustrative embodiment is dimensioned for use with a conventional 35 mm image format, i.e. a rectangular format of 24 mm by 36 mm, the diagonal of which is 43.26 mm. Obviously, the illustrative lens can be modified to other image formats, and can be adapted to non-planar image surfaces.

The lens 20 includes two lens element units 22 and 24. The front unit 22 moves for focusing and for compensating during zooming and the variator unit 24 comprises respective forward and rearward sub-units 26 and 28 which move independently for zooming.

The first lens element unit 22 which has overall negative power, includes a negative meniscus element 30 at the front of the lens, a second negative meniscus element 32 in an intermediate position and a bi-convex positive lens element 34 at the rearward end of that unit.

The forward lens element sub-unit 26 of the variator unit 24 is a positive power doublet made up of a bi-convex positive forward lens element 36 and a negative meniscus rearward lens element 38. The majority of the magnification change during zooming is atributable to this variator sub-unit 26.

The rearward negative power lens element sub-unit 28 of variator unit 24 comprises a forward positive meniscus lens element 40 spaced from a negative power doublet consisting of a bi-concave negative element 42 and a bi-convex positive element 44.

As is evident by comparing FIGS. 1 and 2, which respectively illustrate the lens in a short and a long focal length condition, it will be seen that the two sub-units of variator unit 24 move independently of each other relative to the film plane 46 and to the forward lens unit 22, which is movable for focusing and for compensating during zooming. A stop or diaphragm 48 is located behind lens element 44 and is movable during zooming to change its spacing from both that element and the film plane.

In its short focal length condition, as shown in FIG. 1, the back focus distance of the lens, i.e. the distance between lens element 44 and film plane 46 is approximately 42 mm, and the stop 48 is located approximately 1 mm behind lens element 44, thereby leaving a distance of approximately 41 mm between the stop and the film plane. This is more than adequate to accommodate a mirror intercepting the ray path at a 45° angle and also to provide room for the mirror to pivot out of the ray path. As is apparent from the drawings, the shortest back focus distance of the lens occurs at the shortest focal length condition. The first principal point of variator unit 24 is located forwardly of the front vertex of lens element 36.

Various constructional parameters for the illustrative lens embodiment in the short focal length condition are given in table 1 below. The surfaces of the lens elements are referenced 1 through 14. As is customary, contacting surfaces of a doublet are given the same reference numeral. In Table 1, the spacing between lens elements is shown in the conventional manner under the heading "thickness" by those dimensions having no corresponding refractive index number. All dimensions throughout the specification are in millimeters unless otherwise stated.

TABLE 1

| SURFACE NO. | RADIUS | THICKNESS | REFRACTIVE INDEX d | Abbe v NUMBER | CLEAR APERTURE |
|---|---|---|---|---|---|
| 1 | 104.80 | 2.00 | 1.80610 | 33.3 | 38.88 |
| 2 | 24.03 | 10.33 | | | 33.18 |
| 3 | −39.33 | 2.00 | 1.83400 | 37.3 | 33.18 |
| 4 | −130.03 | .10 | | | 34.79 |
| 5 | 176.34 | 5.00 | 1.80518 | 25.5 | 35.72 |
| 6 | −59.04 | 43.94* | | | 35.90 |
| 7 | 36.02 | 6.65 | 1.64000 | 60.2 | 26.34 |
| 8 | −35.10 | 1.40 | 1.84666 | 23.8 | 25.95 |
| 9 | −63.03 | 0.50* | | | 25.66 |
| 10 | 18.81 | 6.00 | 1.48749 | 70.4 | 19.13 |
| 11 | 34.18 | 7.30 | | | 16.38 |
| 12 | −111.03 | 1.00 | 1.80420 | 46.5 | 12.63 |
| 13 | 10.86 | 3.50 | 1.50137 | 56.3 | 11.83 |
| 14 | −168.92 | 1.00* | | | 11.70 |
| 15 | Diaphragm | 41.00* | | | 10.53 |

*Zooming spaces

Table 2 below gives the lengths of the variable air spaces 50, 52, 54 and 56 for various effective focal lengths including the two focal length extremes.

TABLE 2

| EFFECTIVE FOCAL LENGTH | AIR SPACE (50) | AIR SPACE (52) | AIR SPACE (54) | AIR SPACE (56) |
|---|---|---|---|---|
| 36.20 | 43.94 | 0.50 | 1.00 | 41.00 |
| 49.94 | 26.00 | 1.71 | 3.00 | 47.62 |
| 101.03 | 0.57 | 8.23 | 8.50 | 69.03 |

Table 3 below gives values of various parameters and characteristics of the illustrative lens embodiment. These parameters and characteristics are as follows:

$F_1$ Absolute value of focal length of first lens unit.

$\phi F_1/F\phi$ where $F\phi$ is the focal length of the objective at the short focal length position.

$PP_1$ Distance from the first principal point of the variator unit at the short focal length condition to the first lens vertex of the variator unit.

K $PP_1/D$ (%) where D is the image diagonal.

$R_1$ Ratio of the magnification of the first sub-unit at long focal length position to the magnification at the short focal length position.

$R_2$ Ratio of the magnification of the second sub-unit at long focal length position to the magnification at the short focal length position.

Q $R_1/R_2$

Minimum ratio of object size to image size.

TABLE 3

| $F_1$ | $\phi$ | $PP_1$ | K | $R_1$ | $R_2$ | Q | $\beta$ |
|---|---|---|---|---|---|---|---|
| 54.31 | 1.5 | 18.52 | 429 | 2.12 | 1.32 | 1.61 | 5.0 |

It will be observed that the illustrative embodiment of the invention has a short focal length which is less than the image diagonal (43.27 mm, for a 35 mm photographic image). Also, because all of the focusing is accomplished by the first lens element unit, the image remains in focus for all object distances.

In the illustrative embodiment of the invention, all of the lens elements are spherical. However, the invention is to be understood as including embodiments in which one or more aspheric surfaces is used. Also, it should be obvious that weak optical elements which do not significantly alter third order aberration corrections or the like might also be employed, but the term "element" is not intended to include such components for purposes of the present application.

The invention has been described in detail with particular reference to an illustrative preferred embodiment, but it will be understood that variations and modifications can be effected within the spirit and scope of the invention.

What is claimed is:

1. A wide-angle close-focus zoom lens having a back focus distance sufficient to accommodate a viewfinder mirror of a single lens reflex camera, said lens comprising:

a negative power focus and compensating lens element unit located at the front of said lens, said focus and compensating lens element unit being movable for focusing and for compensating during zooming and having two mutually adjacent negative lens elements followed by a positive lens element, and a positive power variator lens element unit comprising:

a movable positive power lens element sub-unit in the form of a positive power doublet that provides the majority of magnification change during zooming, and a movable negative power lens element sub-unit rearwardly of said positive power lens element sub-unit, said negative power sub-unit being in the form of a positive lens element spaced forwardly from a negative power lens element doublet.

2. The invention defined by claim 1 including a movable stop located rearwardly of said negative power lens element sub-unit.

3. The invention defined by claim 2 in which said lens has a zoom range equal at least to 36.2 to 101.27 and a back focus distance behind said stop of at least 41 mm when said lens is in its short focal length condition.

4. The invention defined by claim 1 in which the two negative lens elements of said focus and compensating unit are meniscus lens elements with their concave faces mutually adjacent.

* * * * *